United States Patent [19]

Ishida et al.

[11] Patent Number: 5,010,863
[45] Date of Patent: Apr. 30, 1991

[54] APPARATUS FOR PREVENTING ENGINE FROM STALLING

[75] Inventors: Tetsuro Ishida; Yoshiaki Danno; Katsuo Akishino, all of Kyoto; Toyoaki Fukui, Uji, all of Japan

[73] Assignee: Mitsubishi Jidosha Kogyo Kabushiki Kaisha, Tokyo, Japan

[21] Appl. No.: 568,466

[22] Filed: Aug. 16, 1990

[30] Foreign Application Priority Data

Aug. 31, 1989 [JP] Japan .................. 1-223316

[51] Int. Cl.⁵ ............................................ F02D 41/04
[52] U.S. Cl. ..................................... 123/339; 123/418; 123/585; 74/860
[58] Field of Search ............... 123/329, 339, 416, 418, 123/424, 585; 74/843, 859, 860, 872, 873, 874

[56] References Cited

U.S. PATENT DOCUMENTS

| | | | |
|---|---|---|---|
| 4,526,144 | 7/1985 | Hasegawa et al. | 123/339 |
| 4,599,980 | 7/1986 | Collonia | 123/585 X |
| 4,625,697 | 12/1986 | Hosaka | 123/339 X |
| 4,665,883 | 5/1987 | Amano et al. | 123/585 X |
| 4,700,679 | 10/1987 | Otobe et al. | 13/585 X |
| 4,721,083 | 1/1988 | Hosaka | 123/339 |

Primary Examiner—Willis R. Wolfe
Attorney, Agent, or Firm—Abelman Frayne Rezac & Schwab

[57] ABSTRACT

A stalling preventing appartus for an engine comprising intake air amount increasing means for increasing the amount of intake air to the engine from idling condition when the vehicle is in a start preparation condition, and rotation speed increase prevention means for preventing the engine speed from increasing due to the increase in intake air amount by the intake air amount increasing means, operation of the intake air amount increasing means and the rotation speed increase prevention means being stopped when the vehicle is in a start preparation condition, whereby a sufficient amount of air is supplied to the engine at starting of the vehicle and a delay in response of the air intake system to the pressing-down operation of the acceleration pedal is eliminated to increase the output torque of the engine at clutch-on and prevent engine stalling.

20 Claims, 3 Drawing Sheets

5,010,863

APPARATUS FOR PREVENTING ENGINE FROM STALLING

BACKGROUND OF THE INVENTION

This invention relates to a stalling prevention apparatus for preventing an engine from stalling at starting of a vehicle, which is particularly used to good advantage in a vehicle equipped with a manual transmission.

In passenger cars and the like equipped with a small-displacement engine with a manual transmission, with a small output torque at the low-speed range compared to trucks, the engine tends to cause stalling unless the driver carefully sets the degree of pressing down the acceleration pedal and the clutch connection timing at starting of the vehicle.

Such an engine stalling at starting of the vehicle can be prevented by skill of the driver to some extent.

In general, stalling of the engine at the start of the vehicle is caused, in addition to a small output torque of the engine at its low rotation speed range, by a delay in response of the air intake system from pressing of the acceleration pedal until the engine output torque increases. Specifically, since a length of time is required after the acceleration pedal is pressed down to open the throttle valve until a large amount of fuel mixture reaches the engine, if the clutch is actuated simultaneously with pressure of the acceleration pedal, stalling tends to occur due to an insufficient increase in output torque of the engine.

For a vehicle equipped with a manual transmission in which the driver starts the vehicle while adjusting the pressing down of the acceleration pedal and the clutch pedal, some skill is required to start the vehicle. Therefore, a beginner who is not experienced in starting the vehicle tends to cause frequent stalling of the engine.

On the other hand, for a vehicle equipped with an automatic transmission with a torque converter, in which the output torque in the low rotation speed range of the engine is enhanced, generation of stalling at starting of the vehicle is reduced, and even a beginner can easily start the vehicle. However, the use of a torque converter inevitably results in increases in costs of the power transmission system and weight of the vehicle. Especially, it has been a problem to use a torque converter in a small-displacement vehicle which has much limitations in the engine room space and the like.

OBJECT OF THE INVENTION

It is a primary object of the present invention to provide a stalling prevention apparatus which eliminate a delayed response of the air intake system at starting of a vehicle equipped with a manual transmission and can smoothly and rapidly start the vehicle in response to the pressing operation of the acceleration pedal.

SUMMARY OF THE INVENTION

In accordance with the present invention there is provided a stalling prevention apparatus comprising start preparation detecting means for detecting a start preparation condition of a vehicle, intake air amount increasing means for increasing the amount of intake air when the vehicle is in a start preparation condition compared to an idling condition, rotation speed increase prevention means for suppressing an increase in rotation speed of the engine due to the increase in the amount of intake air by the intake air amount increasing means, start detecting means for detecting a starting condition of the vehicle, and control means for interrupting operations of the intake air amount increasing means and the rotation speed increase prevention means according to a detection signal of the start preparation condition by the start preparation detecting means.

Therefore, when a start preparation condition of the vehicle is detected by the start preparation detecting means, exhaust amount increasing means and the rotation speed increase prevention means are operated by the control means to increase the intake air amount to the engine from that for an idling condition and suppress the resulting increase in engine rotation speed by varying the ignition timing and the fuel supply amount.

When starting of the vehicle is detected by the start detecting means, operation of the intake air amount increasing means and the rotation speed increase prevention means is interrupted by the control means to revert the intake air amount to the engine back to an ordinary control amount according to the pressing amount of the acceleration pedal and the like and also revert the ignition timing and the fuel supply amount back to normal values. As a result, a sufficient amount of intake air is supplied to the engine at starting of the vehicle to eliminate a delay in response of the air intake system to pressing of the acceleration pedal, and the output torque of the engine has already been increased when the clutch is connected, thereby preventing the engine from stalling.

DETAILED DESCRIPTION OF THE PREFERRED EMBODIMENT

Figure 1:
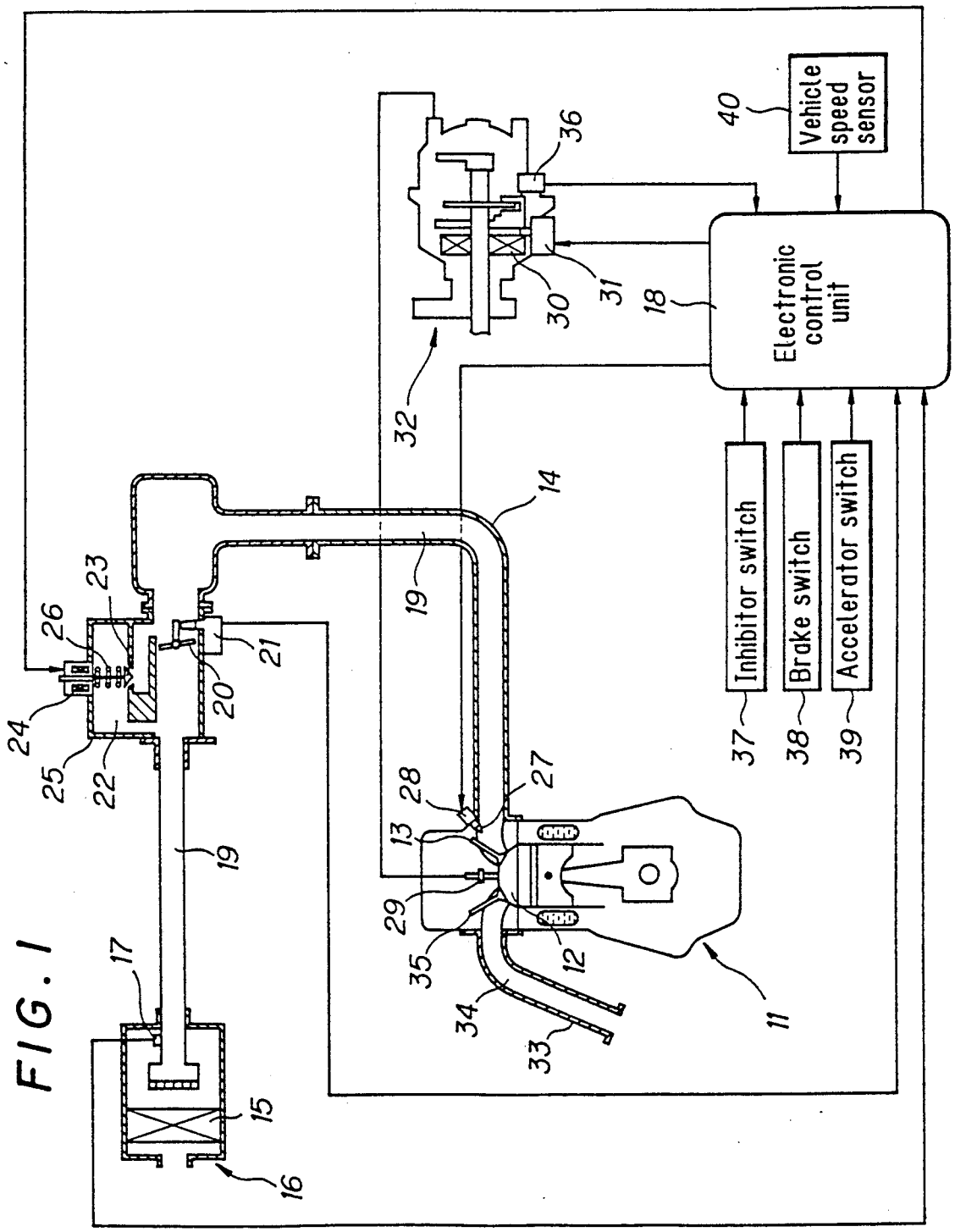
FIG. 1 is a schematic view of an embodiment in which the stalling prevent apparatus according to the present invention is applied to a vehicle equipped with a 4-cylinder internal combustion engine with an automatic transmission.

As shown in FIG. 1, an air cleaner 16 containing an air cleaner element 15 is connected to the upstream end of an air intake pipe 14 of which the rear end communicates with a combustion chamber 12 of an engine 11 through an air intake valve 13. The air cleaner 16 incorporates an air flow sensor 17 such as a Karman vortex flow meter or the like for detecting the amount of intake air to the combustion chamber of the engine 11. The air flow sensor 17 is connected with an electronic control unit 18 to which is outputted a detection signal from the air flow sensor 17.

The air intake pipe 14 is mounted halfway with a throttle valve 20 for adjusting the amount of intake air supplied to the combustion chamber 12 by varying the opening of an air intake passage 19 formed in the air intake pipe 14 according to the operation of the acceleration pedal (not shown). The throttle valve 20 is mounted with an idle switch 21 for detecting a fully-closed condition of the throttle valve 20. A bypass passage 22, of which both ends communicate with the air intake passage 19 at the upstream and downstream sides of the throttle valve 20, is provided with a needle valve 23 which is capable of controlling the opening of the bypass passage 22. The needle valve 23 is connected with a solenoid 24 which is duty controlled by the electronic control unit 18. Between a bypass pipe 25 forming the bypass passage 22 and the needle valve 23 is disposed a compression coil spring 26 which urges the needle valve 23 to close the bypass passage 22.

When the solenoid 24 is duty driven by the electronic control unit 18 against the force of the compression coil spring 26, open time of the needle valve 23 is controlled independently of the operation the needle valve 23 to suction air into the combustion chamber 12 through the bypass passage 22. The bypass passage 22, the needle valve 23, the solenoid 24, the bypass pipe 25, and the compression coil spring 26 are aimed for idle speed control (ISC) to decrease the rotation speed of the engine 11 and improve the mileage during idling operation of the engine 11, and this embodiment utilizes these components as intake air amount increasing means which will be described later.

This embodiment uses the intake air amount increasing means comprising the bypass passage 22 and the needle valve 23 to open and close the bypass passage 22 by the solenoid 24, however, alternatively, a configuration may be used in which the throttle valve 20 of the engine 11 in the idling operation condition is operated by an actuator.

At the downstream end side of the air intake passage 19 is provided a fuel injection nozzle 27 to inject fuel (not shown) into the combustion chamber 12 of the engine 11. The fuel injection nozzle 27 is connected with an electromagnetic valve 28 which is duty controlled by the electronic control unit 18, and fuel is injected from the fuel injection nozzle 27 to the combustion chamber 12 through the electromagnetic valve 28. Thus, the electronic control unit 18 controls the valve opening time of the electromagnetic valve 28 according to the detection result of intake air amount from the air flow sensor 17 to supply fuel of the corresponding amount, thereby setting the air/fuel ratio of the combustion chamber 12 to a predetermined value.

An ignition plug 29 located in the combustion chamber 12 of the engine 11 is connected to a distributor 32 incorporating an ignition coil 30 and a power transistor 31. Off operation of the power transistor 31 generates a high voltage in the ignition coil 30 to spark the ignition plug 29, and on operation of the power transistor 31 begins charging the ignition coil 30.

Therefore, in normal operation condition of the engine 11, air taken into the air intake passage 19 through the air cleaner 16 according to the opening of the throttle valve 20 is mixed with fuel injected from the fuel injection nozzle 27 to an adequate air/fuel ratio, the air/fuel mixture is ignited by the ignition plug 29 in the combustion chamber 12, and exhaust gas is discharged through an exhaust valve 35 from an exhaust passage 34 formed in the exhaust pipe 33.

In order to prevent the engine 11 from stalling at starting, this embodiment uses various sensors and switches in addition to the above-described air flow sensor 17 and idle switch 21, to control the open time of the needle valve 23 and the ignition timing of the ignition plug 29 according to signals from these sensors and switches. Specifically, the distributor 32 incorporates a crank angle position sensor 36 as engine speed detecting means for detecting rotational speed $N_E$ of the engine 11 and the crank angle position. Furthermore, a selector lever of the automatic transmission (not shown) is connected with an inhibitor switch 37 to detect whether or not the driver selects a forward or backward gear, that is, the driver intends to run the vehicle. In addition, the brake system incorporates a brake switch 38 for detecting whether or not the brake pedal (not shown) is pressed down. Furthermore, the acceleration pedal (not shown) is provided with an accelerator switch 39 to detect whether or not the driver's foot is on the acceleration pedal, that is, the driver intends to run the vehicle.

The accelerator switch 39 can be a touch switch attached to the surface of the acceleration pedal or a touch switch disposed between the vehicle body and the acceleration pedal utilizing a play of the acceleration pedal to the throttle valve 20.

Detection signals from these sensors 17 and 36 and the switches 21 and 37 to 39 are individually inputted to the electronic control unit 18, and, according to these signals, the electronic control unit 18 corrects the intake air amount and ignition timing of the engine 11 as needed.

Figure 2:
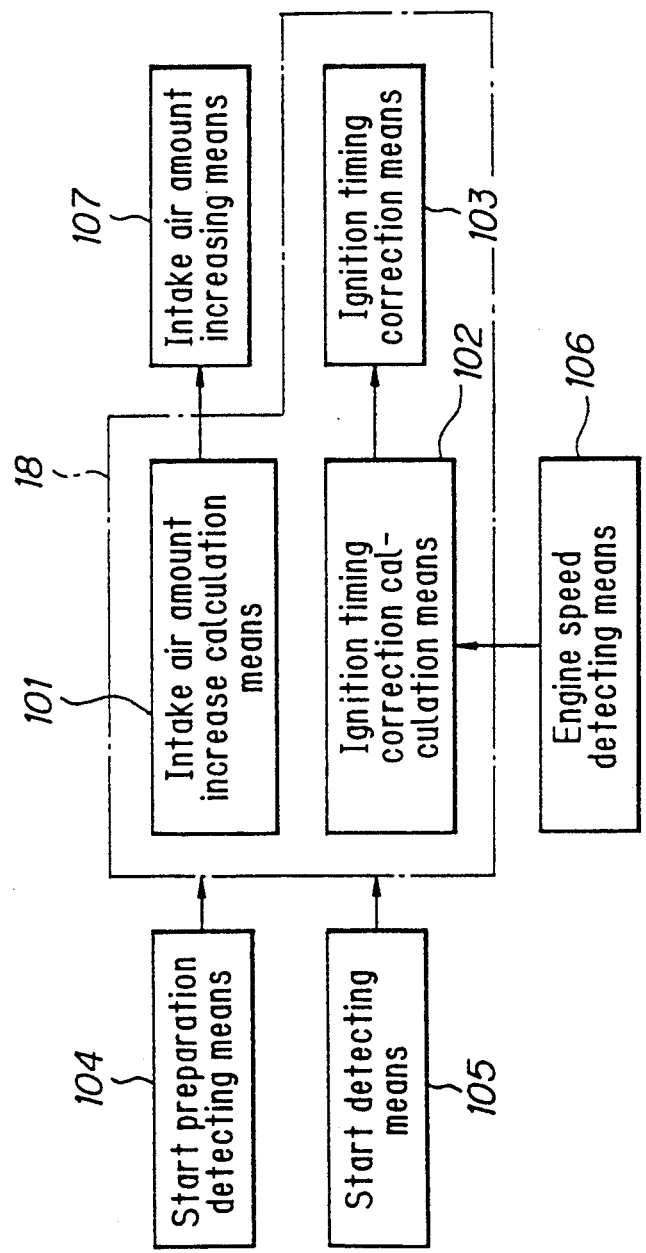
FIG. 2 is a control block diagram of the embodiment.

Referring to FIG. 2 showing a control block of this embodiment, the electronic control unit 18 incorporates intake air amount increase calculation means 101, ignition timing correction calculation means 102 and ignition timing correction means 103. The electronic control unit 18 is inputted with detection signals from start preparation detecting means 104, start detecting means 105, and the crank angle position sensor 36 as engine speed detecting means 106. The intake air amount increase calculation means 101 outputs a duty signal corresponding to the intake air amount increase data to the solenoid 24 as a main device of intake air amount increasing means 107 of this embodiment. At the same time, the ignition timing correction calculation means 102 outputs a signal corresponding to the ignition timing correction data to the ignition timing correction means 103 which controls of ON/OFF timing to the ignition coil 30 through the power transistor 31.

The intake air amount increase calculation means 101 calculates the duty ratio of the solenoid 24 when idle speed control is stopped and the intake air amount to the engine 11 is increased. Specifically, although the duty ratio of the solenoid 24 can be changed at a time so that a predetermined target intake air amount is reached, in this embodiment, to prevent shocks due to an abrupt change in combustion condition of the engine 11, the duty ratio of the solenoid 24 is gradually varied so that the target intake air amount is reached in a predetermined period of time.

The ignition timing correction calculation means 102 calculates an ignition timing correction value to the engine 11 so that the intake air amount the ignition timing is retarded from that before increasing the intake air amount, at the same time the intake air amount to the engine 11 is increased, to suppress an increase in rotation speed of the engine 11 in association with increasing the intake air amount. Specifically, engine speed $N_I$ $D$ for idle speed control plus a predetermined constant C is set as a target engine speed, and, when the current engine speed $N_E$ is higher than the target engine speed, that is, when the electronic control unit 18 determines that the engine speed $N_E$ is too high, the ON/OFF timing of current to the ignition coil 30 is controlled by the electronic control unit 18 through the power transistor 31 according to the detection signal from the crank angle position sensor 36 to retard the ignition timing of the ignition plug 29 by a predetermined value at a time.

In this embodiment an increase in rotation speed of the engine 11 associated with increasing intake air amount is prevented by retarding the ignition timing, however, alternatively, it is possible to prevent the engine speed from increasing by decreasing supply of fuel to the engine 11. In this case, fuel supply to the engine 11 can be reduced by controlling the current to the electromagnetic valve 28 of the fuel injection nozzle 27.

The start preparation detecting means 104 of this embodiment comprises the idle switch 21, the inhibitor switch 37, the vehicle speed sensor 40, the accelerator switch 39, and the brake switch 38. When it is detected from an ON signal of the idle switch 21 that the throttle valve 20 is fully closed, from an OFF signal of the inhibitor switch 37 that the selector lever of the automatic transmission selects a forward or backward gear, using the vehicle speed sensor 40 connected to the electronic control unit 18 that the vehicle is running at a very low speed of below 2.5 km per hour or in a stop condition, from an ON signal of the accelerator switch 39 that the driver's foot is on the acceleration pedal, and from an ON signal of the brake switch 38 that the brake pedal is pressed down, the electronic control unit 18 determines that the vehicle is in a start preparation condition.

One or more (e.g., detection signals from the accelerator switch 39 and the brake switch 38) can be removed from the detection conditions for the start preparation condition, but in such a case, control of the removed conditions becomes required, resulting in problems such as an impaired mileage. Since this embodiment is directed to a vehicle which incorporates an automatic transmission, a signal from the brake switch 37 is read as a detection condition for the start preparation condition. However, for a vehicle which incorporates a manual transmission, it is preferable to add a signal from a clutch switch for detecting a clutch off condition in place of the brake switch 37 as a detection condition for the start preparation condition. The clutch switch can be of a type which determines clutch on and off conditions from the clutch pedal position by a position sensor or a pair of touch switches.

When the start detecting means 105, which has the idle switch 21 and the brake switch 38, detects that the throttle valve 20 is not fully closed from an OFF signal of the idle switch 21 and that the vehicle is increasing the intake air amount and correcting the ignition timing according to the increase in intake air amount and the brake pedal is not pressed down from an OFF signal of the brake switch 38, the electronic control unit 18 determines that the vehicle is in a start preparation condition.

Figure 3:
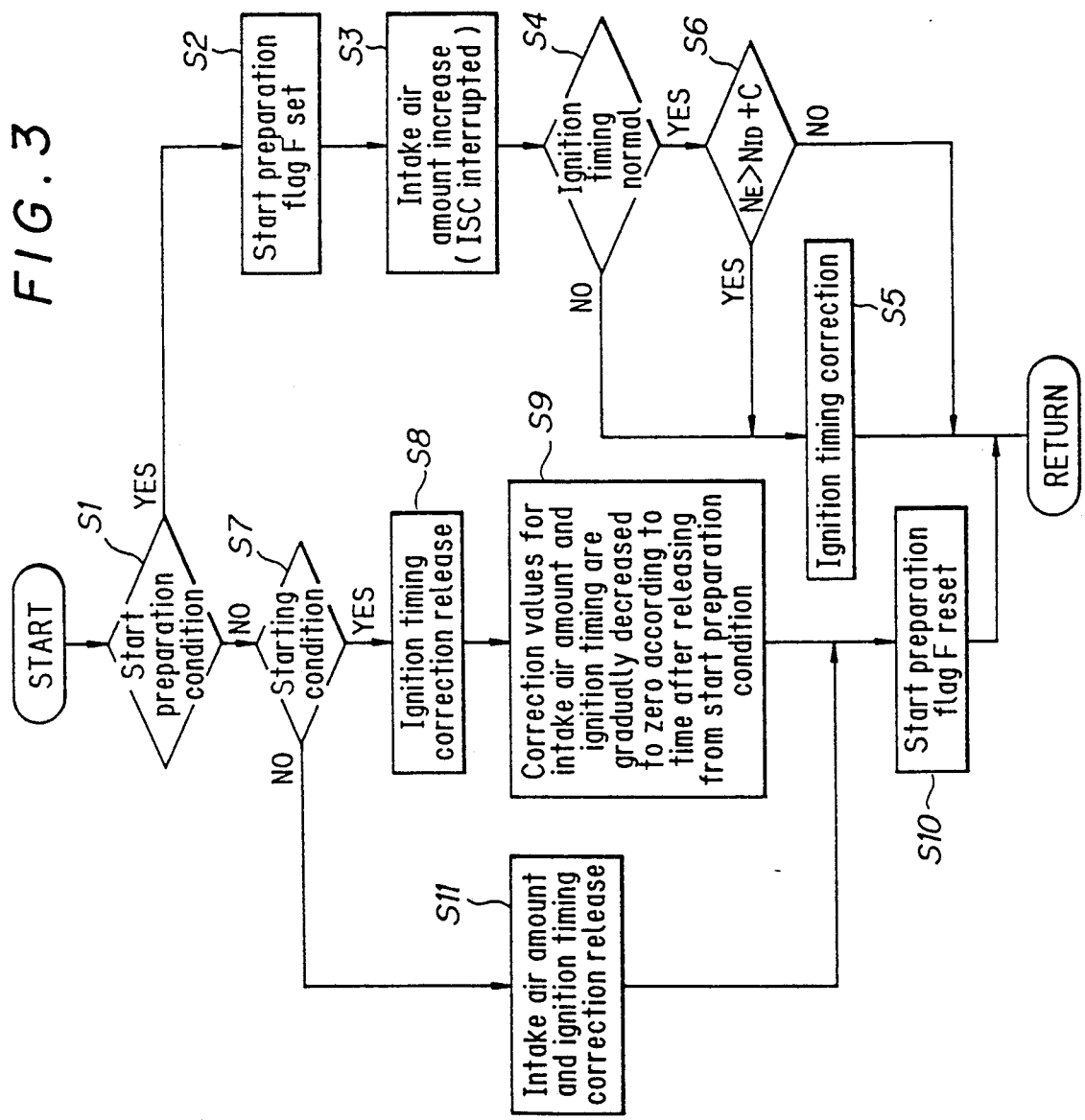
FIG. 3 is a flow chart of the present invention.

Referring to FIG. 3 showing the control flow of this embodiment, whether or not the vehicle is in a start preparation condition is determined from a detection signal from the start preparation detecting means 104 in step S1.

When the vehicle is determined to be in a start preparation condition in step S1, a start preparation flag F is set in step S2. In step S3, the electronic control unit 18 stops idle speed control of the engine 11, and controls increasing the intake air amount to the engine 11 through the solenoid 24 according to the calculation result of the intake air amount increase calculation means 101. After that, whether or not the ignition timing is corrected according to the increase in intake air amount in step S4.

At the initial stage, since the ignition timing is not corrected, the processing goes to step S5, in which the ignition timing is corrected in association with the increase in intake air amount by the ignition timing correction means 103 according to the calculation result of the ignition timing correction calculation means 102 to prevent the rotation speed of the engine 11 from increasing due to the increase in intake air amount.

When, in step S4, the ignition timing is determined to have been corrected according to the increase in intake air amount, it is determined in step S6 whether or not the current engine speed $N_E$ is greater than the engine speed $N_{ID}$ for idle speed control plus a predetermined constant C.

When it is determined in step S6 that the current engine speed $N_E$ is greater than the engine speed $N_{ID}$ for idle speed control plus a predetermined constant C, that is, the current engine speed $N_E$ is so high as to give an unusual feeling, the processing goes again to step S5, in which the ignition timing is corrected by the ignition timing correction means 103 according to the calculation result of the ignition timing correction calculation means 102.

When, in step S6, the current engine speed $N_E$ is smaller than the engine speed $N_{ID}$ for idle speed control plus a predetermined constant C, that is, the current engine speed $N_E$ is determined to be adequate, nothing is made and the control flow is ended.

When, is step S1, the vehicle is determined not in a start preparation condition, it is judged in step S7 whether or not the vehicle is in a start condition according to a detection signal from the start detecting means 104.

When, in step S7, the vehicle is judged to be in a start condition, in step S8, correction in step S5 of ignition timing in association with the increase in intake air amount in canceled. Then, in step S9, the electronic control unit 18 gradually decreases the intake air amount correction and ignition timing correction values to zero according to the time from the start preparation condition to the releasing. After that, the start preparation flag F is reset in step S10.

As a result, when the driver presses down the acceleration pedal to start the vehicle, since a sufficient amount of air to start the vehicle is already supplied to the engine 11, the vehicle can be started smoothly and rapidly according to the pressing-down amount of the acceleration pedal without stalling of the engine by only reverting the ignition timing back to the original advance angle.

When the fuel supply amount is corrected in place of the ignition timing, the correction values for the intake air amount and fuel supply amount can be gradually reduced to zero according to the time from the start preparation condition to releasing.

When, in step S7, the vehicle is determined as not in a start condition, the intake air amount increasing control and ignition timing correction associated with the increase in intake air amount are released in step S11, and the control flow goes to step S10.

The above-described control flow is executed in a shorter period than the signal at every 90 degrees from the crank angle position sensor 36.

What is claimed is:

1. An apparatus for preventing an engine from stalling comprising start preparation detecting means for detecting a start preparation condition of a vehicle, intake air amount increasing means for increasing the amount of intake air when the vehicle is in a start preparation condition compared to an idling condition, rotation speed increase prevention means for suppressing an increase in rotation speed of the engine due to said increase in the amount of intake air by said intake air amount increasing means, start detecting means for detecting a starting condition of the vehicle, and control means for interrupting operations of said intake air amount increasing means and said rotation speed increase prevention means according to a detection signal of the start preparation condition by said start preparation detecting means.

2. The apparatus of claim 1 wherein for a vehicle equipped with an automatic transmission, said start preparation detecting means comprises an idle switch for detecting a fully-closed condition of said throttle valve, an inhibitor switch for detecting a gear position of the transmission, a vehicle speed sensor for detecting running speed of the vehicle, an accelerator switch for detecting that the driver's foot is on the acceleration pedal, and a brake switch for detecting that a brake is actuated.

3. The apparatus of claim 1 wherein for a vehicle equipped with a manual transmission, said start preparation detecting means comprises an idle switch for detecting a fully-closed condition of said throttle valve, an inhibitor switch for detecting a gear position of the transmission, a vehicle speed sensor for detecting running speed of the vehicle, an accelerator switch for detecting that the driver's foot is on the acceleration pedal, and a clutch switch for detecting that a clutch is in a disengaged condition.

4. The apparatus of claim 1 wherein for a vehicle equipped with an automatic transmission, said start detecting means comprises an idle switch for detecting a fully-closed condition of said throttle valve, a brake switch for detecting that a brake is actuated, and said start preparation detecting means.

5. The apparatus of claim 1 wherein for a vehicle equipped with a manual transmission, said start detecting means comprises an idle switch for detecting a fully-closed condition of said throttle valve, a clutch switch for detecting that a clutch is in a semi-engaged condition, and said start preparation detecting means.

6. The apparatus of claim 1 wherein said intake air amount increasing means has a sub-intake air passage disposed parallel to an intake air passage across a throttle valve and acts as an idle control device for controlling intake air amount during idling operation of the engine.

7. The apparatus of claim 6 wherein for a vehicle equipped with an automatic transmission, said start preparation detecting means comprises an idle switch for detecting a fully-closed condition of said throttle valve, an inhibitor switch for detecting a gear position of the transmission, a vehicle speed sensor for detecting running speed of the vehicle, an accelerator switch for detecting that the driver's foot is on the acceleration pedal, and a brake switch for detecting that a brake is actuated.

8. The apparatus of claim 6 wherein for a vehicle equipped with a manual transmission, said start preparation detecting means comprises an idle switch for detecting a fully-closed condition of said throttle valve, an inhibitor switch for detecting a gear position of the transmission, a vehicle speed sensor for detecting running speed of the vehicle, an accelerator switch for detecting that the driver's foot is on the acceleration pedal, and a clutch switch for detecting that a clutch is in a disengaged condition.

9. The apparatus of claim 6 wherein for a vehicle equipped with an automatic transmission, said start detecting means comprises an idle switch for detecting a fully-closed condition of said throttle valve, a brake switch for detecting that a brake is actuated, and said start preparation detecting means.

10. The apparatus of claim 6 wherein for a vehicle equipped with a manual transmission, said start detecting means comprises an idle switch for detecting a fully-closed condition of said throttle valve, a clutch switch for detecting that a clutch is in a semi-engaged condition, and said start preparation detecting means.

11. The apparatus of claim 1 wherein said rotation speed increase prevention means is an ignition timing control device for retarding the ignition timing of the engine.

12. The apparatus of claim 1 wherein for a vehicle equipped with an automatic transmission, said start preparation detecting means comprises an idle switch for detecting a fully-closed condition of said throttle valve, an inhibitor switch for detecting a gear position of the transmission, a vehicle speed sensor for detecting running speed of the vehicle, an accelerator switch for detecting that the driver's foot is on the acceleration pedal, and a brake switch for detecting that a brake is actuated.

13. The apparatus of claim 11 wherein for a vehicle equipped with a manual transmission, said start preparation detecting means comprises an idle switch for detecting a fully-closed condition of said throttle valve, an inhibitor switch for detecting a gear position of the transmission, a vehicle speed sensor for detecting running speed of the vehicle, an accelerator switch for detecting that the driver's foot is on the acceleration pedal, and a clutch switch for detecting that a clutch is in a disengaged condition.

14. The apparatus of claim 11 wherein for a vehicle equipped with an automatic transmission, said start detecting means comprises an idle switch for detecting a fully-closed condition of said throttle valve, a brake switch for detecting that a brake is actuated, and said start preparation detecting means.

15. The apparatus of claim 11 wherein for a vehicle equipped with a manual transmission, said start detecting means comprises an idle switch for detecting a fully-closed condition of said throttle valve, a clutch switch for detecting that a clutch is in a semi-engaged condition, and said start preparation detecting means.

16. The apparatus of claim 1 wherein said rotation speed increase prevention means is a fuel supply control device for decreasing the amount of fuel supplied to the engine.

17. The apparatus of claim 16 wherein for a vehicle equipped with an automatic transmission, said start preparation detecting means comprises an idle switch for detecting a fully-closed condition of said throttle valve, an inhibitor switch for detecting a gear position of the transmission, a vehicle speed sensor for detecting running speed of the vehicle, an accelerator switch for detecting that the driver's foot is on the acceleration pedal, and a brake switch for detecting that a brake is actuated.

18. The apparatus of claim 16 wherein for a vehicle equipped with a manual transmission, said start preparation detecting means comprises an idle switch for detecting a fully-closed condition of said throttle valve, an inhibitor switch for detecting a gear position of the transmission, a vehicle speed sensor for detecting running speed of the vehicle, an accelerator switch for detecting that the driver's foot is on the acceleration pedal, and a clutch switch for detecting that a clutch is in a disengaged condition.

19. The apparatus of claim 16 wherein for a vehicle equipped with an automatic transmission, said start detecting means comprises an idle switch for detecting a fully-closed condition of said throttle valve, a brake switch for detecting that a brake is actuated, and said start preparation detecting means.

20. The apparatus of claim 16 wherein for a vehicle equipped with a manual transmission, said start detecting means comprises an idle switch for detecting a fully-closed condition of said throttle valve, a clutch switch for detecting that a clutch is in a semi-engaged condition, and said start preparation detecting means.

* * * * *